US012698850B2

(12) United States Patent
Handa

(10) Patent No.: US 12,698,850 B2
(45) Date of Patent: Aug. 4, 2026

(54) LINED PIPE AND JOINTS THEREOF

(71) Applicant: Janak H. Handa, Toronto (CA)

(72) Inventor: Janak H. Handa, Toronto (CA)

( * ) Notice: Subject to any disclaimer, the term of this patent is extended or adjusted under 35 U.S.C. 154(b) by 417 days.

(21) Appl. No.: 18/524,396

(22) Filed: Nov. 30, 2023

(65) Prior Publication Data

US 2025/0180143 A1      Jun. 5, 2025

(51) Int. Cl.
*F16L 13/02*          (2006.01)
*B23K 9/028*         (2006.01)
*F16L 9/147*          (2006.01)

(52) U.S. Cl.
CPC ........ *F16L 13/0236* (2013.01); *B23K 9/0282* (2013.01); *F16L 9/147* (2013.01)

(58) Field of Classification Search
CPC ... B23K 9/0282; B23K 2101/10; F16L 9/147; F16L 13/02; F16L 13/0236; F16L 13/0263; F16L 13/0218; F16L 13/0254; F16L 58/181; F16L 58/1009
See application file for complete search history.

(56) References Cited

U.S. PATENT DOCUMENTS

| | | | | |
|---|---|---|---|---|
| 182,435 | A | * | 9/1876 | Guyer ..................... F16L 23/20 |
| | | | | 285/353 |
| 792,377 | A | * | 6/1905 | Young ................... F16L 19/086 |
| | | | | 285/337 |

| | | | | |
|---|---|---|---|---|
| 2,005,189 | A | * | 6/1935 | Herr ........................ F16L 13/08 |
| | | | | 285/133.11 |
| 3,020,068 | A | * | 2/1962 | Costanzo ................ F16L 17/04 |
| | | | | 285/364 |
| 3,441,294 | A | * | 4/1969 | Krieg ................... F16L 13/0263 |
| | | | | 285/55 |
| 3,516,689 | A | * | 6/1970 | Pace ................... F16L 13/0263 |
| | | | | 285/55 |
| 3,516,690 | A | * | 6/1970 | Kreig ................... F16L 13/0236 |
| | | | | 285/55 |
| 3,653,688 | A | * | 4/1972 | Sakakibara ........... F16L 17/025 |
| | | | | 403/303 |
| 3,843,170 | A | * | 10/1974 | Bagnulo ............. F16L 13/0236 |
| | | | | 285/364 |

(Continued)

FOREIGN PATENT DOCUMENTS

| | | | | | |
|---|---|---|---|---|---|
| CN | | 108458196 A | * | 8/2018 | .............. F16L 47/03 |
| CN | | 110296286 A | * | 10/2019 | .............. F16L 13/02 |

(Continued)

*Primary Examiner* — Jennifer H Gay
(74) *Attorney, Agent, or Firm* — Aird & McBurney LP

(57)          ABSTRACT

A lined pipe assembly includes a metallic pipe and a tubular metallic coupler. The coupler is welded to the pipe and includes a coupler inner wall defining a coupler internal profile. A tubular metallic sleeve is pressed fit into the coupler internal profile. An outer wall of the sleeve and a proximal portion of the coupler inner wall define an annular space therebetween. A non-metallic liner lines an inner wall of the pipe, a distal portion of the coupler inner wall, and an inner wall of the sleeve. To join a pair of the lined pipe assemblies, a tubular collar is provided inside the first and second couplers to abut against bearing surfaces of the couplers, and define an annular space between an inner wall of the collar and outer walls of the pipes. The pipes are then welded at a location that axially overlaps the collar.

11 Claims, 4 Drawing Sheets

Cooling fluid in at lower temperature

Cooling fluid out at higher temperature

(56)                    References Cited

U.S. PATENT DOCUMENTS 3,892,032  A  *   7/1975  Bagnulo  .................. F16L 25/03
                                                            29/458
4,366,971  A  *   1/1983  Lula  ...................... F16L 58/182
                                                            138/DIG. 6
5,104,152  A  *   4/1992  Galfant  ................. F16L 58/181
                                                            285/55
5,348,211  A  *   9/1994  White  ................... F16L 58/181
                                                            285/55
5,405,176  A  *   4/1995  Babel  .................... B21D 39/04
                                                            29/520
5,730,472  A  *   3/1998  Krause  .................. F16L 47/00
                                                            285/21.2
5,988,691  A  *  11/1999  Cruickshank  ....... F16L 13/0263
                                                            285/55
6,719,186  B2 *   4/2004  Mudge, Jr.  ............ B23K 37/06
                                                            228/175
7,793,992  B2 *   9/2010  Pionnetti  .............. F16L 39/005
                                                            285/288.1
8,104,518  B2 *   1/2012  Wildermuth  ........ F16L 33/2076
                                                            285/903
8,783,735  B2 *   7/2014  Kwon  .................... B64D 37/32
                                                            29/520

9,915,383  B2 *   3/2018  Compton  ................ F16L 13/02
11,118,426  B2 *  9/2021  Hargrave  ............... E21B 17/04
2008/0315578  A1 * 12/2008  Pionetti  .................. F16L 59/14
                                                            285/123.15
2010/0207381  A1 *  8/2010  Cornut Gentille  .... F16L 33/213
                                                            156/158
2010/0229994  A1 *  9/2010  Wildermuth  ........ F16L 33/2078
                                                            138/109
2014/0103638  A1 *  4/2014  Compton  ................ F16L 13/02
                                                            285/55
2016/0131287  A1 *  5/2016  Cloos  .................... F16L 13/141
                                                            285/337
2020/0393065  A1 * 12/2020  Hargrave  ............... E21B 17/04
2025/0180143  A1 *  6/2025  Handa  ................. B23K 9/0282
2025/0361957  A1 * 11/2025  Feeney  .............. F16L 13/0263

FOREIGN PATENT DOCUMENTS

FR              2920856  A1  *   3/2009  ............ F16L 33/207
JP              2016534293  A  *  11/2016  ............. F16L 47/03
KR              100900215  B1  *   6/2009  ............. F16L 47/03
WO              WO-9522713  A1  *   8/1995  ......... F16L 13/0263

* cited by examiner

*Cooling fluid in at lower temperature*

*Cooling fluid out at higher temperature*

LINED PIPE AND JOINTS THEREOF

FIELD OF THE DISCLOSURE

The present disclosure relates to lined pipe, joints of lined pipe, and method for methods for making them.

BACKGROUND OF THE DISCLOSURE

Pipelines for conveying oil, gas, or other substances are formed from sections of metallic pipes that are welded together end-to-end. Such pipes may have a protective internal non-metallic liner (e.g., urethane, rubber, neoprene, or other polymers). Welding of the metallic sections together generates heat that can damage or delaminate the non-metallic liner from the metallic pipe. The prior art provides different approaches to address this problem.

U.S. Pat. No. 2,324,928 (Hill; Jul. 20, 1943) discloses attaching tubular couplers to the pipes near their ends, where the ends of the tubular couplers are radially spaced part from the pipe and overlap each other, and welded together with a lap joint.

U.S. Pat. No. 3,892,032 (Bagnulo; Jul. 1, 1975) discloses a similar approach except the ends of the couplers oppose each other end-to-end, and are welded together with a butt joint. Bagnulo also discloses providing a sleeve that overlaps the outer coatings of the pipe to protect them from weld material that drops during the welding process, cooling the space enclosed by the couplers, and filling the space between the couplers and the pipes with a molten compound that hardens, through openings defined by the couplers.

U.S. Pat. No. 3,965,555 (Webster et al.; Jun. 29, 1976) discloses metal tubes with flared-out ends that diverge radially from the liner, providing a heat shield collar inside the divergent ends and in overlapping contact with the liner, compressing the ends of the liner together until the inner surfaces of the divergent ends abut against the ends of the heat shield collar, introducing a thermally insulating material (e.g., fibreglass, asbestos, ceramics, glass ceramics, or a refractory material) or a gas (e.g., air, argon, nitrogen or carbon dioxide) in the space between the heat shield collar and the divergent ends, and butt welding the divergent ends together.

U.S. Pat. No. 4,640,532 (Pope; Feb. 3, 1987) discloses abutting the ends of the liners of the two pipes against each other, attaching couplers to the ends of the pipe with the couplers defining a slot that acts as a heat barrier for the liner, butt welding the ends of the couplers together while pumping liquid or cooling air through the slots via external passageways to reduce heat build up, and injecting a liquid substance (e.g., an epoxy compound) into the slot.

U.S. Pat. No. 5,001,320 (Conley et al.; Mar. 19, 1991) discloses attaching a tubular coupler to a first pipe, placing a heat-resistant fabric like material saturated with coolant or a ceramic cylinder beneath the tubular coupler, inserting the first pipe into a bell-shaped end of a second pipe so that end of the coupler abuts the bell-shaped end, and butt welding the end of the coupler to the bell-shaped end.

Chinese patent application publication no. 107642647A (Wang et al.; Jan. 30, 2018) discloses a connection structure for butt welding lined and flanged pipes. The connection structure includes chambers for circulating cooling air and cooling water during the welding process.

The approaches disclosed by Hill, Bagnulo, and Conley require lap-welding couplers to the outer surface of the pipe, which increase the overall outer diameter of the resulting pipe assembly. The approaches disclosed by Pope and Conley require pipes that are manufactured with a flared-out end. The couplers disclosed by Webster et al. must be manufactured to define the slot. These approaches also depend on means for precise alignment of the ends of couplers or pipes for welding. There remains a need for alternative lined pipe assemblies and methods of making them, and for means for aligning the couplers for welding.

SUMMARY OF THE DISCLOSURE

In one aspect, a lined pipe assembly is provided, that includes a metallic pipe, a tubular metallic coupler, a tubular metallic sleeve, and a non-metallic liner. The metallic pipe includes an annular pipe proximal end, and a pipe inner wall. The tubular metallic coupler includes an annular coupler distal end welded to the pipe proximal end, an annular coupler proximal end for receiving a weld, and a coupler inner wall comprising a distal portion and a proximal portion, and defining a coupler internal profile. The tubular metallic sleeve includes a sleeve distal end pressed fit into the coupler internal profile to retain the sleeve within the coupler, a sleeve proximal end, and a sleeve outer wall, wherein the sleeve outer wall and the proximal portion of the coupler inner wall define an annular space therebetween. The non-metallic liner lines the pipe inner wall, the coupler inner wall distal portion, and the sleeve inner wall. The following optional features are entirely independent from one another. In other words, the lined pipe assembly may further include any one or more of the following optional features. Optionally, the liner comprises a liner proximal end extending axially beyond the sleeve proximal end. Optionally, the coupler defines a passageway for fluid communication from an outer wall of the coupler to the annular space.

In yet another aspect, a pair of the aforementioned pipe assemblies is provided. The coupler proximal ends of the pipe assemblies are welded together.

In another aspect, a method of making a lined pipe assembly is provided. The method includes: welding an annular distal end of a tubular coupler to an annular proximal end of a metallic pipe, wherein the coupler comprises an annular coupler proximal end for receiving a weld, and a coupler inner wall comprising a distal portion and a proximal portion, and defining a coupler internal profile; press fitting a distal end of a tubular metallic sleeve into the coupler internal profile, wherein an outer wall of the sleeve and the proximal portion of the coupler inner wall define an annular space therebetween; and after the welding and the press fitting steps, lining an inner wall of the pipe, the distal portion of the coupler inner wall, and an inner wall of the sleeve with a non-metallic liner. The following optional features are entirely independent from one another. In other words, the method may further include any one or more of the following optional features. Optionally, the liner comprises a liner proximal end extending axially beyond the sleeve proximal end. Optionally, the coupler defines a passageway for fluid communication from an outer wall of the coupler to the annular space.

In yet another aspect, a kit for making an end-to-end joint of first and second pipes is provided. The kit includes a tubular metallic first coupler, a tubular metallic second coupler, and a tubular collar. The tubular metallic first coupler includes a first coupler distal end attached to or for attachment to the first pipe, an annular first coupler proximal end for receiving a weld, and an annular first coupler internal bearing surface. The tubular metallic second coupler includes a second coupler distal end attached to or for attachment to the second pipe, an annular second coupler proximal end for receiving the weld, and an annular second
coupler internal bearing surface. The tubular collar includes
an annular collar first end surface for abutting the first
coupler internal bearing surface, and an annular collar
second end surface abutting the second coupler bearing
surface. In use, when the collar is disposed inside the first
and second couplers with the collar first end surface abutting
the first coupler internal bearing surface, and the collar
second end surface abutting the second coupler bearing
surface, an inner wall of the collar and outer walls of the
pipes define an annular space therebetween, and the first
coupler proximal end and the second coupler proximal end
are aligned for welding together at a location that axially
overlaps the collar. The following optional features are
entirely independent from one another. In other words, the
kit may further include any one or more of the following
optional features. Optionally, an outer wall of the collar
defines a radially inward depression. Optionally, either or
both of the first and second couplers define a passageway for
fluid communication from an outer wall of the coupler to the
annular space. Optionally, each of the first and second
coupler internal bearing surfaces is a flat radially-oriented
annular surface.

In yet another aspect, an end-to-end joint of first and
second pipes is provided. The joint includes a tubular
metallic first coupler, a tubular metallic second coupler, a
tubular collar, and a weld. The tubular metallic first coupler
includes a first coupler distal end attached to the first pipe,
an annular first coupler proximal end, and a first coupler
internal bearing surface. The tubular metallic second coupler
includes a second coupler distal end attached to the second
pipe, an annular second coupler proximal end, and a second
coupler internal bearing surface. The tubular collar is dis-
posed inside the first and second couplers, includes a collar
first end surface abutting the first coupler internal bearing
surface, a collar second end surface abutting the second
coupler bearing surface, wherein an inner wall of the collar
and outer walls of the pipes define an annular space ther-
ebetween. The weld connects the first coupler proximal end
to the second coupler proximal end at a location that axially
overlaps the collar. The following optional features are
entirely independent from one another. In other words, the
joint may further include any one or more of the following
optional features. Optionally, an outer wall of the collar
defines a radially inward depression. Optionally, one or both
of the first and second couplers (i.e. at least one of the first
and second couplers) defines a passageway for fluid com-
munication from an outer wall of the coupler to the annular
space. Optionally, the annular space is filled with an epoxy
material. Optionally, each of the first and second coupler
internal bearing surfaces is a flat radially-oriented annular
surface.

In yet another aspect, a method of making an end-to-end
joint of first and second pipes is provided. The method
includes: providing a tubular metallic first coupler compris-
ing a first coupler distal end attached to the first pipe, an
annular first coupler proximal end, and an first coupler
internal bearing surface; providing a tubular metallic second
coupler comprising a second coupler distal end attached to
the second pipe, an annular second coupler proximal end,
and a second coupler internal bearing surface; placing a
tubular collar inside the first coupler, with a collar first end
surface abutting the first coupler internal bearing surface;
positioning the second coupler so that the collar is inside the
second coupler with a collar second end surface abutting the
second coupler internal bearing surface, whereupon an inner
wall of the collar and outer walls of the pipes define an annular space therebetween, and the first coupler proximal
end and the second coupler proximal end are aligned for
welding together at a location that axially overlaps the
collar; and welding the first coupler proximal end to the
second coupler proximal end. The following optional fea-
tures are entirely independent from one another. In other
words, the method may further include any one or more of
the following optional features. Optionally, the method
includes the further step of collecting molten material pro-
duced by the welding step in a radially inward depression
defined by an outer wall of the collar. Optionally, the method
includes the further step of circulating a fluid through the
annular space during the welding. Optionally, the method
includes the further step of filling the annular space with an
epoxy material after the welding.

In yet another aspect, another lined pipe assembly is
provided. The lined pipe assembly includes a metallic pipe,
a tubular metallic coupler, and a non-metallic liner. The
metallic pipe includes an annular pipe proximal end, a pipe
outer wall, and a pipe inner wall. The tubular metallic
coupler includes an annular coupler distal end welded to the
pipe outer wall, an annular coupler proximal end for receiv-
ing a weld, and a coupler inner wall comprising a distal
portion and a proximal portion. The distal portion of the
coupler inner wall contacts the pipe outer wall. The pipe
outer wall and the proximal portion of the coupler inner wall
define an annular space therebetween. The non-metallic
liner lines the pipe inner wall, and includes a liner outer layer
and a liner inner layer. The liner outer layer comprises a
rubber material in contact with the pipe inner wall. The liner
inner layer comprises a urethane material in contact with the
inner layer. In embodiments, the liner outer layer is coter-
minous with the pipe proximal end, while the liner inner
layer extends axially to a liner proximal end that extends
axially beyond the pipe proximal end. In such embodiments,
the liner inner layer may cover the pipe proximal end and an
end of the liner outer layer. Optionally, the liner outer layer
is coterminous with the pipe proximal end, and the liner
inner layer extends axially to a liner proximal end that
extends axially beyond the pipe proximal end. As a further
option, the liner inner layer covers the pipe proximal end and
an end of the liner outer layer.

BRIEF DESCRIPTIONS OF THE DRAWINGS

For a better understanding of the various embodiments
described herein and to show more clearly how they may be
carried into effect, reference will now be made, by way of
example only, to the accompanying drawings in which.

DETAILED DESCRIPTION

Figure 1:
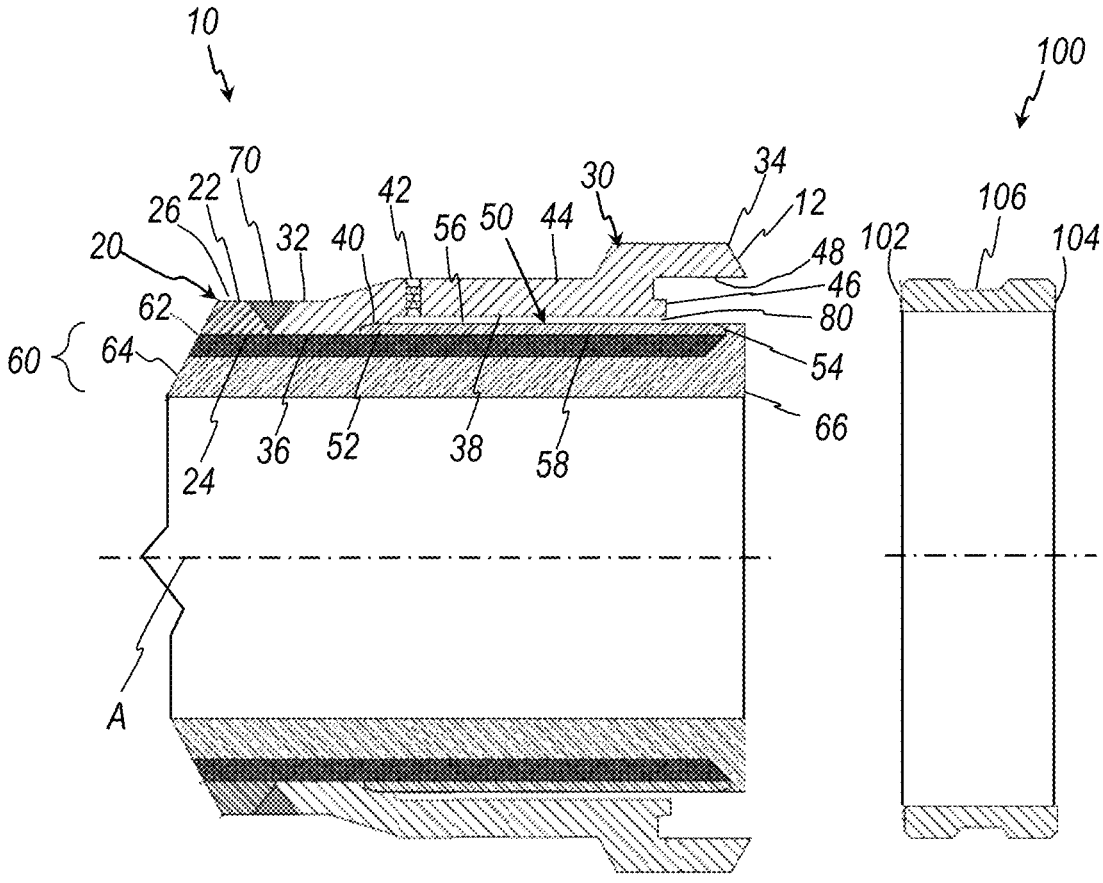
FIG. 1 shows a medial cross-sectional elevation view of
an embodiment of a pipe assembly of the present disclosure,
along with a collar.

Interpretation.

For simplicity and clarity of illustration, where considered
appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

As used in this document, "attached" in describing the relationship between two connected parts includes the case in which the two connected parts are "directly attached" with the two connected parts being in contact with each other, and the case in which the connected parts are "indirectly attached" and not in contact with each other, but connected by one or more intervening other part(s) between.

The embodiments of the inventions described herein are exemplary (e.g., in terms of materials, shapes, dimensions, and constructional details) and do not limit by the claims appended hereto and any amendments made thereto. Persons skilled in the art will appreciate that there are yet more alternative implementations and modifications possible, and that the following examples are only illustrations of one or more implementations. The scope of the invention, therefore, is only to be limited by the claims appended hereto and any amendments made thereto.

Lined Pipe Assembly.

FIG. 1 shows a lined pipe assembly 10 of the present disclosure in combination with a collar 100. The lined pipe assembly 10 includes a metallic pipe 20, a tubular metallic coupler 30, a tubular metallic sleeve 50, and a non-metallic liner 60. As used herein, the term "axial" refers to the direction that is parallel to the central axis A of the pipe 20, and the term "radial" refers to directions that are perpendicular to the central axis of the pipe 20. In FIG. 1, for example, the axial direction is the horizontal direction in the drawing plane, and radial directions include the direction the vertical direction in the drawing plane. As used herein, the terms "distal" and "proximal" are used to describe positions that are relatively farther and closer, respectively, in the axial direction to one of the ends of the pipe assembly 10.

The pipe 20, coupler and sleeve 50 may be made of a metal such as carbon steel alloy.

The metallic pipe 20 has an annular pipe proximal end 22, a pipe inner wall 24 and a pipe outer wall 26.

Figure 2:
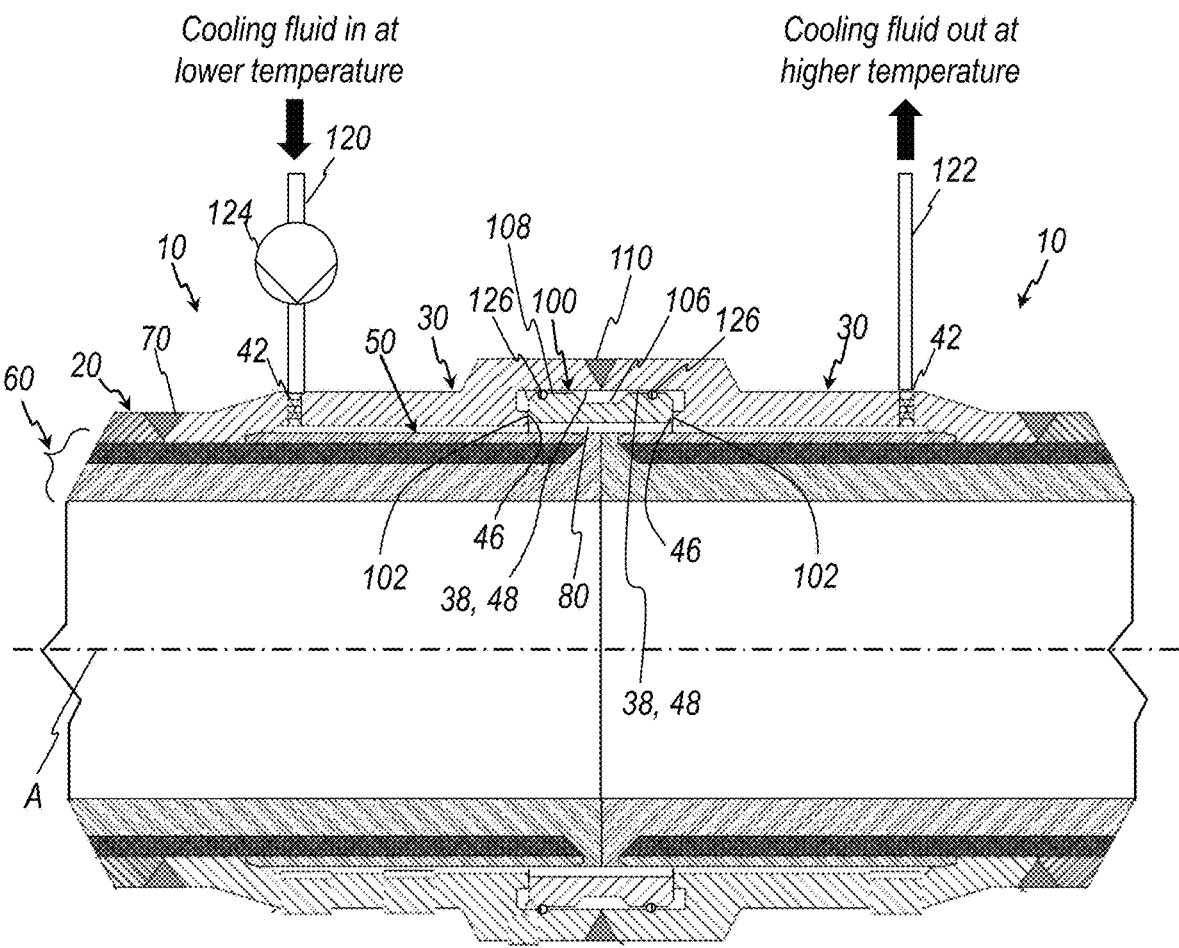
FIG. 2 shows a medial cross-sectional elevation view of
a pair of pipe assemblies of FIG. 1 joined together, end-to-
end.

The metallic coupler 30 is used to join the lined pipe assembly 10 to another like lined pipe assembly 10 as shown in FIG. 2. The coupler 30 has an annular coupler distal end 32, an annular coupler proximal end 34, and an inner wall including a distal portion 36 and a proximal portion 38, and defining a coupler internal profile 40. The coupler distal end 32 and the pipe proximal end 22 are joined by a butt weld 70. The coupler proximal end 34 is beveled to provide a groove face for the location 12 of another butt weld to the coupler proximal end 34 of another like lined pipe assembly 10. The inner diameter of the proximal portion 38 is greater than the inner diameter of the distal portion 36. The coupler internal profile 40 is located at the transition from the distal portion 36 to the proximal portion 38.

The sleeve 50 continues the metallic cover for the liner 60 to provide support for the liner 60. The sleeve 50 has a sleeve distal end 52, a sleeve proximal end 54, a sleeve outer wall 56, and a sleeve inner wall 58. The sleeve distal end 52 is pressed fit into the coupler internal profile 40 to retain the sleeve 50 within the coupler 30. As used herein, "pressed fit", refers to the two parts being retained together by friction between interfacing surfaces of the two parts. If the liner 60 in the vicinity of the sleeve 50 is worn and the sleeve 50 itself is compromised, then the sleeve 50 may be removed from the coupler 30, and another sleeve 50 may be pressed fit into the coupler internal profile 40.

An annular space 80 is defined between sleeve outer wall 56 and the proximal portion 38 of the coupler inner wall, and extends axially to the liner proximal end 66. The annular space 80 provides spatial separation in the radial direction between the weld location 12, and the liner 60. The coupler 30 defines a passageway 42 for fluid communication from the coupler outer wall 44 to the annular space 80. The passageway 42 may be used to circulate a cooling fluid (which may be either a liquid or a gas) in the annular space 80 while welding the coupler proximal end 34 to the coupler proximal end 34 of another like or similar lined pipe assembly 10, and to introduce an epoxy material into the annular space 80 after welding.

The liner 60 is made of one more non-metallic materials to protect the metallic pipe 20 from effects such as corrosion, other chemical reactions, or abrasion. In the embodiment shown, the liner 60 includes a liner outer layer 62, and a liner inner layer 64. The liner outer layer 62, is in contact with the pipe inner wall 24, the proximal portion 36 of the coupler inner wall and the sleeve inner wall 58, and is made of a liner outer layer material (e.g., rubber). The liner inner layer 64 is in contact with the liner outer layer 62, and is made of a liner inner layer material (e.g., urethane) that may differ from the liner outer layer material. In other embodiments, the liner 60 may have only one layer of material, or a different number of layers, and be made of different non-metallic material(s) (e.g., rubber, neoprene, urethane, epoxy, or other polymers).

The liner 60 lines the pipe inner wall 24, the distal portion 36 of the coupler inner wall, and the sleeve inner wall 58. In FIG. 1, the liner 60 has a liner proximal end 66 that extends axially beyond the sleeve proximal end 54. More particularly, the liner outer layer 62 is substantially coterminous with the sleeve proximal end 54, and the liner inner layer 64 covers the sleeve proximal end 54 and an end of the liner outer layer 62 to protect their interface with each other. In other embodiments, the liner proximal end 66 may be coterminous with the sleeve proximal end 54.

The lined pipe assembly 10 may be made in a factory prior to being deployed for field installation. The coupler distal end 32 is welded to the pipe proximal end 22. The sleeve distal end 52 is pressed fit into the coupler internal profile 40. This press fitting may be performed either before or after welding the coupler 30 to the pipe 20. The pipe inner wall 24, the distal portion 36 of the coupler inner wall, and the sleeve inner wall 58 are lined with the non-metallic liner material to form the liner 60. The liner 60 may be formed using a variety of techniques known in the art, having regard to the nature of the liner material. As non-limiting examples, such techniques involve attaching sheets of liner material to the aforementioned inner wall surfaces, or depositing a hardening fluid liner material on the inner wall surfaces by spraying or spinning techniques (e.g., as described in U.S. Pat. No. 4,107,254A; Webster et al.; 1978 Aug. 15), or vulcanizing a liner material (e.g., neoprene rubber) on the inner wall surfaces.

Kit of Couplers and Collar.

A kit may be provided that includes a pair of the couplers 30 and the collar 100. The couplers 30 in the kit may be provided either detached from the pipes 20, or attached to the pipes 20. A purpose of the collar 100 is to align the couplers 30 for welding the coupler proximal ends 34 together. To that end, the couplers 30 each have a coupler alignment surface shown at 48, which may be a portion of the proximal portion 38 of the coupler inner wall. The coupler alignment surface 48 extends at least somewhat axially, and which extends circumferentially. In the embodiment shown in FIG. 1*a* the coupler alignment surface 48 extends directly axially (i.e. parallel to the axis A of the pipe 20), and directly circumferentially (i.e. circularly about the axis A) and is radially inwardly facing (i.e. faces the axis A). The collar 100 has a collar alignment surface shown at 108, which is engageable with the coupler alignment surface 48. Thus, in the present embodiment, the collar alignment surface 108 extends directly axially and directly circumferentially, and faces radially outwardly (i.e. away from the axis A). By inserting the collar 100 into one of the couplers 30 such that the collar alignment surface 108 is engaged with the coupler alignment surface 48 of the said one of the couplers 30, and then inserting the other one of the couplers 30 on the collar 100, such that the collar alignment surface 108 is engaged with the coupler alignment surface 48 of the said other one of the couplers 30, guides the couplers 30 to be in alignment with one another.

Additionally, the coupler 30 defines an internal bearing surface 46 for abutment against one of the end surfaces 102, 104 of the collar 100. In FIG. 1, the internal bearing surface 46 and the coupling end surfaces 102, 104 are flat, radially-oriented annular surfaces. In other embodiments, they may have other shapes. The internal bearing surface 46 is preferably complementary in shape to the coupling end surfaces 102, 104 so that their mating limits relative movement between the coupler 30 and the collar 100.

In the embodiment shown in FIG. 1, the outer wall of the collar 100 also defines a radially inward depression 106, which collects any molten material produced by a welding process that may fall through the gap between the coupler proximal ends 34 of two lined pipe assemblies 10 when they are being welded together such as shown in FIG. 2. The inward depression 106 facilitates the collection of such molten material while also inhibiting the molten material from touching both the collar 100 and the pipes 20. This inhibits inadvertently welding the collar 100 to the couplers 30. It will be understood, however, that the collar 100 could be provided without the inward depression 106. Optionally, the collar 100 could be provided with a simple rectangular cross-sectional shape (i.e. without the inward depression and without the chamfered corners that are present on the collar 100 shown in FIGS. 1 and 2).

Joint of Lined Pipe Assemblies.

Referring to FIG. 2, a pair of the lined pipe assemblies 10 as shown in FIG. 1 are joined together end-to-end. For convenient reference, the terms "first" and "second" are used to distinguish between the two lined pipe assemblies 10 (and their constituent parts) on the left side and right side, respectively of FIG. 2. The joint may be made according to the following steps, which may be performed in the field where the pipes are to be installed. The collar 100 is placed inside the first coupler 30 so that the collar first end surface 102 abuts the first coupler internal bearing surface 46. The lined pipe assembly 10 is positioned so that the collar 100 is inside the second collar 30, and the collar second end surface 104 abuts the second coupler internal bearing surface 46. When doing so, the liner proximal ends 66 are abutted and compressed against each other. In this manner, the collar 100 assists with aligning the coupler proximal ends 34 for welding together at a weld location that axially overlaps the collar 100. When so positioned, the weld location axially overlaps the collar 100, and specifically the collar depression 106. An inflow line 120 is connected to the first coupler passageway 42, and an outflow line 122 is connected to the second coupler passageway 42. A pump 124 is used to circulate a cooling fluid into the annular space 80 via the inflow line 120 and the first coupler passageway 42. (If the sleeves 50 are considered as defining part of "pipes" stated more generally, then annular space 80 may be considered as being defined between the inner wall of the collar 100 and outer walls of the "pipes".) The cooling fluid may be a gas (e.g., air) or a liquid (e.g., glycol). Optionally, a pair of seals 126 (e.g., in the form of O-ring seals) may be provided between the collar alignment surface 108 and the coupler alignment surface 48, to isolate the juncture of coupler proximal ends 34 from the cooling fluid to keep this region dry of any liquid cooling fluid. Thus, it may be said that the collar alignment surface 108 is engaged with the coupler alignment surfaces 48 of the couplers 30, via the seals 126. While the cooling fluid is being circulated, the coupler proximal ends 34 are joined with a butt weld 110. The cooling fluid is at temperature that is lower than the temperature of the lined pipe assemblies 10 in the vicinity of the butt weld 110. Heat produced by the welding process conducts through the collar 100 and is absorbed by the cooling fluid in the annular space 80. The cooling fluid, now at a relatively higher temperature, exits the annular space 80 via the second coupler passageway 42 and the outflow line 122. If no cooling fluid is circulated through the annular space 80, then the collar 100 still acts as a heat shield, and the air in the annular space 80 still serves to thermally insulate the liner 60. The coupler depression 106 collects any molten weld material that may pass through the juncture between the coupler proximal ends 34, to prevent such material from spilling onto or otherwise contacting the liner 60. After the butt weld 110 is formed, the inflow line 120 and the outflow line 122 are disconnected from the coupler 30. A fluid epoxy material is introduced via one of the coupler passageways 42 into the annular space 80. When cured, the epoxy material forms a fluid tight barrier around the juncture of the two liner proximal ends 66.

Alternative Embodiment

Figure 3:
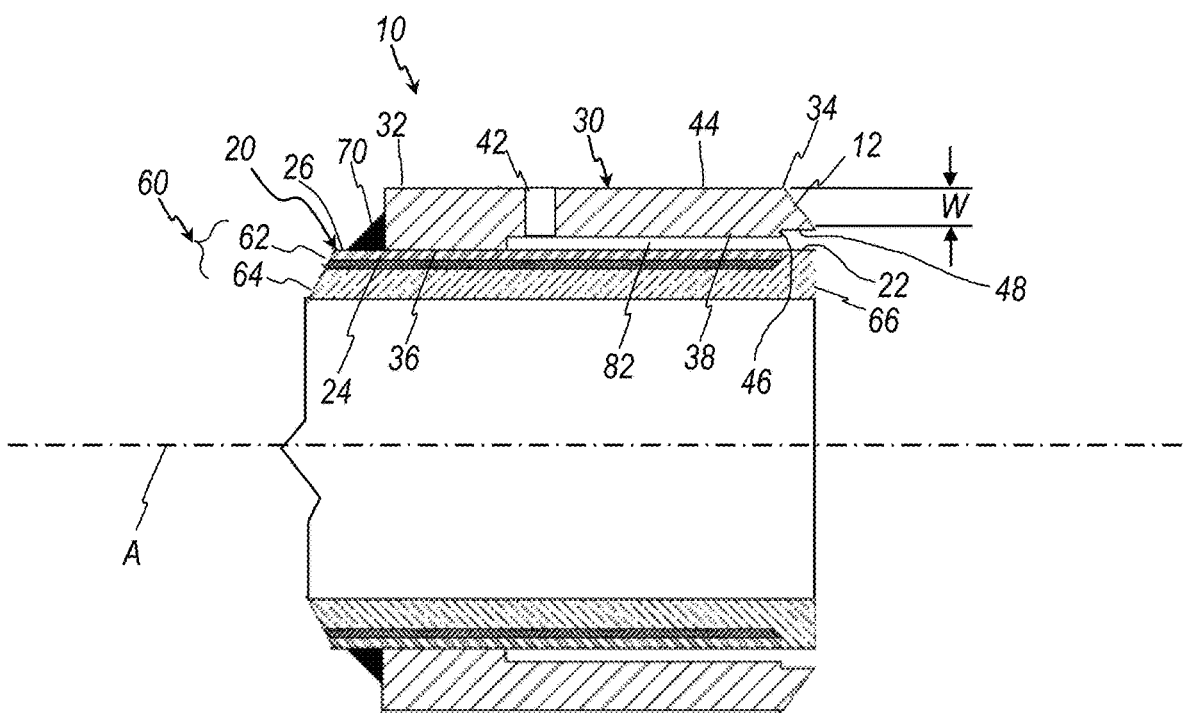
FIG. 3 shows a medial cross-sectional elevation view of
a second embodiment of a pipe assembly of the present
disclosure.
Figure 4:
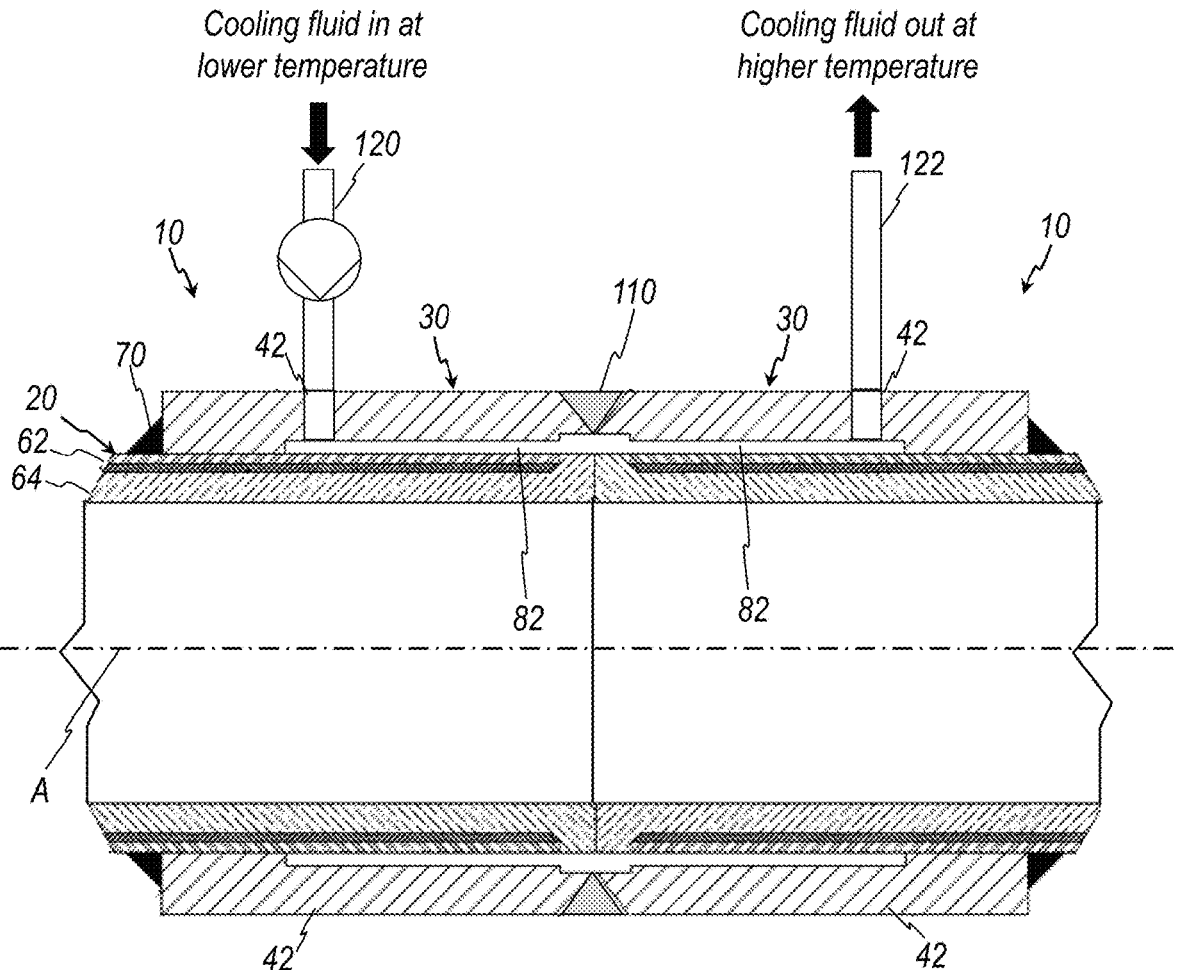
FIG. 4 shows a medial cross-sectional elevation view of
a pair of pipe assemblies of FIG. 3 joined together, end-to-
end.

FIG. 3 shows another embodiment of a lined pipe assembly 10 of the present disclosure. FIG. 4 shows a pair of the lined pipe assemblies of FIG. 3 joined together, end-to-end. Reference numerals that are used in FIG. 1 or FIG. 2 are repeated in FIG. 3 or FIG. 4 to indicate corresponding or analogous elements. It will be understood that disclosures relating to the embodiment of FIG. 1 or FIG. 2 also apply to embodiments of FIG. 3 or FIG. 4 except where such disclosures are inconsistent with differences between the embodiments as discussed below.

As non-limiting examples, the coupler 30 may have an inner diameter (as defined by the distal portion 36 of the coupler inner wall) from about 8.73 inches (221 mm) to about 48.18 inches (1224 mm); the coupler may have an outer diameter (as defined by the outer wall) from about 10.00 inches (254 mm) to about 50.703 inches (1289 mm); and a wall thickness (as denoted by dimension "W" in FIG. 3) from about 0.220 inches (5.59 mm) to about 0.874 inches (22.2 mm). Such dimensions may substantially match the sizes of the Nominal Pipe Size (MPS) standard for pipe sizes used in North America.

The embodiment shown in FIG. 3 or FIG. 4 differs from the embodiment shown in FIG. 1 or FIG. 2 in a least the following aspects.

The annular coupler distal end 32 of the coupler 30 is joined to the external surface of the metallic pipe 20 by a lap weld 70. The distal portion 36 of the coupler inner wall contacts the pipe outer wall 26. The pipe 20 extends beyond the distal portion 36 of the coupler inner wall so that coupler 30 axially overlaps the pipe 20. Accordingly, an annular space 82 is defined between the pipe outer wall 26 and the proximal portion 38 of the coupler inner wall. Unlike the embodiment shown in FIGS. 3 and 4, this embodiment does not have a press-fit sleeve 50.

The liner outer layer 62 is in contact with the pipe inner wall 24, and is made of a liner outer layer material (e.g., rubber). The liner inner layer 64 is in contact with the liner outer layer 62, and is made of a liner inner layer material (e.g., urethane) that may differ from the liner outer layer material. The liner 60 lines the pipe inner wall 24. In FIG. 3, the liner 60 has a liner proximal end 66 that extends axially beyond the pipe proximal end 20. More particularly, the liner outer layer 62 is substantially coterminous with the pipe proximal end 22, while the liner inner layer 64 defines the liner proximal end 66 and covers the pipe proximal end 22 and an end of the liner outer layer 62 to protect their interface with each other. In other embodiments, the liner proximal end 66 may be coterminous with the pipe proximal end 22.

The lined pipe assembly 10 shown in FIG. 3 may be made in factory prior to being deployed for field installation, to be joined end-to-end with another like or similar lined pipe assembly 10, as shown in FIG. 4. The joint may be made according to the following steps. The lined pipe assemblies 10 are positioned to abut their liner proximal ends 66, which may be compressed against each other. When so positioned, one or more pump(s) 124 is used to circulate a cooling fluid into the annular space 82 via one or more inflow line(s) 120 and the first coupler passageway(s) 42. The cooling fluid exits the annular space 82 via the one or more second coupler passageway 42 and an outflow line 122. While the cooling fluid is being circulated through the annular space 82, the coupler proximal ends 34 are joined with a butt weld 110. After the butt weld 110 is formed, a fluid epoxy material is introduced via one of the coupler passageways 42 into the annular space 82. When cured, the epoxy material forms a fluid tight barrier around the juncture of the two liner proximal ends 66.

It is optionally possible for one to provide a kit that includes a pair of the couplers 30 shown in FIG. 3, and a collar (which may optionally be similar to the collar 100). In such a kit, each coupler 30 includes the coupler alignment surface 48, which is engageable with the collar alignment surface 108 (optionally via a seal 126). In such a kit, each coupler 30 may optionally include the internal bearing surface 46, which is engageable with one of the end surfaces 102, 104 of the collar 100.

It will be noted that FIGS. 1-4 are all sectional views of pipes and other elements. It will be understood by one skilled in the art that the pipes and other elements shown in FIGS. 1-4 may have any suitable shape. For example, the pipes may be circular pipes, and the other elements that are used to assist in the joining of the pipes (such as the collar 100) will be similarly circular. It is alternatively possible for the pipes to have some other shape, such as elliptical, or even polygonal. Certain features shown in the figures will be understood to not extend all the way around the pipes, such as, for example, the passageway 42, the fluid inflow line 120, the pump 124 and the fluid outflow line 122. The passageway 42, the fluid inflow line 120 and the fluid outflow line 122 are simply conduits such as hoses, tubes or pipes, and the pump 124 may be any suitable type of pump such as a centrifugal pump.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

PARTS LIST

10 Lined pipe assembly
12 Weld location
20 Pipe
22 Pipe, proximal end
24 Pipe, inner wall
26 Pipe, outer wall
30 Coupler
32 Coupler, distal end
34 Coupler, proximal end
36 Coupler, inner wall, distal portion
38 Coupler, inner wall, proximal portion
40 Coupler, inner wall, internal profile
42 Coupler, passageway
44 Coupler, outer wall
46 Coupler, internal bearing surface
48 Coupler, coupler alignment surface
50 Sleeve
52 Sleeve, distal end
54 Sleeve, proximal end
56 Sleeve, outer wall 58 Sleeve, inner wall
60 Liner
62 Liner, outer layer (e.g., rubber)
64 Liner, inner layer (e.g., urethane)
66 Liner, proximal end
70 Weld: pipe to coupler
80 Annular space between sleeve and coupler
82 Annular space between pipe and coupler
100 Collar
102 Collar, first end surface
104 Collar, second end surface
106 Collar, depression
108 Collar, collar alignment surface
110 Weld: coupler to coupler
120 Fluid inflow line
122 Fluid outflow line
124 Pump
126 Seal

What is claimed is:

1. A lined pipe assembly comprising:
a metallic pipe comprising an annular pipe proximal end, and a pipe inner wall;
a tubular metallic coupler comprising an annular coupler distal end welded to the pipe proximal end, an annular coupler proximal end for receiving a weld, and a coupler inner wall comprising a distal portion and a proximal portion, and defining a coupler internal profile;
a tubular metallic sleeve comprising a sleeve distal end pressed fit into the coupler internal profile to retain the sleeve within the coupler, a sleeve proximal end, and a sleeve outer wall, wherein the sleeve outer wall and the proximal portion of the coupler inner wall define an annular space therebetween; and
a non-metallic liner lining the pipe inner wall, the coupler inner wall distal portion, and the sleeve inner wall.

2. The lined pipe assembly of claim 1, wherein the liner comprises a liner proximal end extending axially beyond the sleeve proximal end.

3. The lined pipe assembly of claim 1, wherein the coupler defines a passageway for fluid communication from an outer wall of the coupler to the annular space.

4. A method of making a lined pipe assembly, the method comprising:
welding an annular distal end of a tubular coupler to an annular proximal end of a metallic pipe, wherein the coupler comprises an annular coupler proximal end for receiving a weld, and a coupler inner wall comprising a distal portion and a proximal portion, and defining a coupler internal profile;
press fitting a distal end of a tubular metallic sleeve into the coupler internal profile, wherein an outer wall of the sleeve and the proximal portion of the coupler inner wall define an annular space therebetween; and
after the welding and the press fitting steps, lining an inner wall of the pipe, the distal portion of the coupler inner wall, and an inner wall of the sleeve with a non-metallic liner.

5. The method of claim 4, wherein the liner comprises a liner proximal end extending axially beyond the sleeve proximal end.

6. The method of claim 4, wherein the coupler defines a passageway for fluid communication from an outer wall of the coupler to the annular space.

7. A pair of pipe assemblies, each in accordance with claim 1, wherein the coupler proximal ends of the pipe assemblies are welded together.

8. A kit for making an end-to-end joint of first and second pipes, the kit comprising:
a tubular metallic first coupler comprising a first coupler distal end attached to or for attachment to the first pipe, an annular first coupler proximal end for receiving a weld, and an annular first coupler internal bearing surface;
a tubular metallic second coupler comprising a second coupler distal end attached to or for attachment to the second pipe, an annular second coupler proximal end for receiving the weld, and an annular second coupler internal bearing surface; and
a tubular collar comprising an annular collar first end surface for abutting the first coupler internal bearing surface, and an annular collar second end surface abutting the second coupler bearing surface;
wherein in use, when the collar is disposed inside the first and second couplers with the collar first end surface abutting the first coupler internal bearing surface, and the collar second end surface abutting the second coupler bearing surface, an inner wall of the collar and outer walls of the pipes define an annular space therebetween, and the first coupler proximal end and the second coupler proximal end are aligned for welding together at a location that axially overlaps the collar.

9. The kit of claim 8 wherein an outer wall of the collar defines a radially inward depression.

10. The kit of claim 8 wherein either or both of the first and second couplers define a passageway for fluid communication from an outer wall of the coupler to the annular space.

11. The kit of claim 8 wherein each of the first and second coupler internal bearing surfaces is a flat radially-oriented annular surface.

* * * * *